(12) United States Patent
Kobayashi et al.

(10) Patent No.: US 11,258,160 B2
(45) Date of Patent: Feb. 22, 2022

(54) LC RESONANT ANTENNA

(71) Applicant: SK-Electronics Co., Ltd., Kyoto (JP)

(72) Inventors: Hideki Kobayashi, Kyoto (JP);
Kiyoshi Ohshima, Kyoto (JP)

(73) Assignee: SK-Electronics Co., Ltd., Kyoto (JP)

( * ) Notice: Subject to any disclaimer, the term of this patent is extended or adjusted under 35 U.S.C. 154(b) by 0 days.

(21) Appl. No.: 16/760,597

(22) PCT Filed: Nov. 2, 2018

(86) PCT No.: PCT/JP2018/040843
§ 371 (c)(1),
(2) Date: Apr. 30, 2020

(87) PCT Pub. No.: WO2019/088253
PCT Pub. Date: May 9, 2019

(65) Prior Publication Data
US 2021/0218123 A1  Jul. 15, 2021

(30) Foreign Application Priority Data
Nov. 2, 2017 (JP) .............................. JP2017-212896

(51) Int. Cl.
*H01Q 1/22* (2006.01)
*H01Q 1/38* (2006.01)
*H01Q 7/00* (2006.01)

(52) U.S. Cl.
CPC ............. *H01Q 1/2225* (2013.01); *H01Q 1/38* (2013.01); *H01Q 7/00* (2013.01)

(58) Field of Classification Search
CPC .......... H01Q 1/2225; H01Q 1/38; H01Q 7/00; H01Q 1/40; H04B 5/0031; H04B 5/0081; H04B 5/0012
See application file for complete search history.

(56) References Cited

U.S. PATENT DOCUMENTS

| 6,075,491 A | 6/2000 | Dakeya et al. |
| 7,519,328 B2 | 4/2009 | Dokai et al. |
| 7,630,685 B2 | 12/2009 | Dokai et al. |

(Continued)

FOREIGN PATENT DOCUMENTS

| CN | 102301528 A | 12/2011 |
| CN | 205621840 U | 10/2016 |

(Continued)

*Primary Examiner* — Seung H Lee
(74) *Attorney, Agent, or Firm* — The Webb Law Firm

(57) ABSTRACT

Provide is an LC resonant antenna including: an inductor layer provided with a coil-shaped inductor; and a capacitor layer provided with a capacitor and laminated on the inductor layer. The capacitor includes a plurality of electrode plates that are aligned with the inductor in a laminating direction of the inductor layer and the capacitor layer and that extend in a surface direction orthogonal to the laminating direction. The inductor is formed to have an axis of a coil center extending in a direction that coincides or substantially coincides with the laminating direction. The plurality of electrode plates each have a passage area that corresponds in the laminating direction to an internal area surrounded by the inductor and allows magnetic flux to pass therethrough.

7 Claims, 14 Drawing Sheets

(56) References Cited

U.S. PATENT DOCUMENTS

| | | | |
|---|---|---|---|
| 7,671,704 B2* | 3/2010 | Hsu | H03H 5/00 |
| | | | 333/185 |
| 7,764,928 B2 | 7/2010 | Dokai et al. | |
| 8,078,106 B2 | 12/2011 | Dokai et al. | |
| 8,326,223 B2 | 12/2012 | Dokai et al. | |
| 8,676,117 B2 | 3/2014 | Dokai et al. | |
| 8,725,071 B2 | 5/2014 | Dokai et al. | |
| 10,013,650 B2* | 7/2018 | Murayama | H01Q 1/2225 |
| 2007/0164414 A1 | 7/2007 | Dokai et al. | |
| 2008/0005773 A1 | 1/2008 | Ikeda | |
| 2008/0061983 A1 | 3/2008 | Dokai et al. | |
| 2009/0009007 A1 | 1/2009 | Kato et al. | |
| 2009/0135079 A1 | 5/2009 | Dokai et al. | |
| 2009/0308938 A1 | 12/2009 | Dokai et al. | |
| 2010/0156563 A1 | 6/2010 | Dokai et al. | |
| 2011/0279340 A1 | 11/2011 | Kato et al. | |
| 2012/0292396 A1 | 11/2012 | Dokai et al. | |
| 2012/0292397 A1 | 11/2012 | Dokai et al. | |
| 2017/0093359 A1 | 3/2017 | Shiokawa | |

FOREIGN PATENT DOCUMENTS

| | | |
|---|---|---|
| CN | 107017858 A | 8/2017 |
| EP | 0878864 A2 | 11/1998 |
| JP | 2004287767 A | 10/2004 |
| JP | 2006319223 A | 11/2006 |
| JP | 2009200748 A | 9/2009 |
| JP | 201056998 A | 3/2010 |
| JP | 2011193245 A | 9/2011 |
| WO | 2007083574 A1 | 7/2007 |

* cited by examiner

LC RESONANT ANTENNA

CROSS-REFERENCE TO RELATED APPLICATION

This application is the United States national phase of International Application No. PCT/JP2018/040843 filed Nov. 2, 2018, and claims priority to Japanese Patent Application No. 2017-212896 filed Nov. 2, 2017, the disclosures of which are hereby incorporated by reference in their entirety.

FIELD

The present invention relates to an LC resonant antenna for transmitting and receiving radio waves.

BACKGROUND

Various types of small antennas provided on electronic devices, articles, or the like have been conventionally provided. Examples of such an antenna includes an LC resonant antenna integrated into an information carrier configured to communicate with a reader-writer in a contactless manner, as disclosed in Patent Literature 1.

The LC resonant antenna includes an insulating board having a thin-plate shape, a booster coil (so called inductor) formed on a surface of the insulating board (hereinafter referred to as a board surface), and a capacitor connected to the booster coil.

The booster coil is formed to swirl inward from an outer peripheral portion of an area of the insulating board along its outer periphery. An area surrounded by the booster coil constitutes a non-forming area in which the booster coil is not formed.

The capacitor includes a front-side conductive film formed on a front surface of the board, and a back-side conductive film formed on a back surface of the board (hereinafter referred to as the back surface of the board).

The front-side conductive film is formed in the non-forming area of the front surface of the board, and connected to an end in the inner peripheral side of the booster coil. The back-side conductive film is arranged in an area of the back surface of the board that corresponds to the non-forming area.

As described above, in the LC resonant antenna, the capacitor is provided in the non-forming area that is located on the inner peripheral side of the booster coil.

When an electric current flows in the booster coil of the conventional LC resonant antenna at the time of communication between an information carrier and a reader-writer, magnetic flux is generated that attempts to pass through the area surrounded by the booster coil, that is, the non-forming area.

However, the conventional LC resonant antenna is configured to have the non-forming area partially blocked by the capacitor provided in the non-forming area, and consequently to cause the capacitor to block the magnetic flux attempting to pass through the non-forming area.

Therefore, the conventional LC resonant antenna has a problem that a decrease in the magnetic flux passing through the area surrounded by the booster coil results in an attenuation in the magnetic field intensity, and thereby results in a restricted read distance. Such a problem is applicable not only to antennas having a booster coil but also to almost any LC resonant antennas having an inductor and a capacitor.

CITATION LIST

Patent Literature

Patent Literature 1: JP 2004-287767 A

SUMMARY

Technical Problem

In view of such circumstances, it is an object of the present invention to provide an LC resonant antenna capable of suppressing a decrease in magnetic flux passing inside the inductor to thereby increase a read distance.

Solution to Problem

An LC resonant antenna of the present invention includes: an inductor layer provided with a coil-shaped inductor; and a capacitor layer provided with a capacitor and laminated on the inductor layer, wherein the capacitor includes a plurality of electrode plates that are aligned with the inductor in a laminating direction of the inductor layer and the capacitor layer and that extend in a surface direction orthogonal to the laminating direction, wherein the inductor is formed to have an axis of a coil center extending in a direction that coincides or substantially coincides with the laminating direction, and wherein the plurality of electrode plates each have a passage area that corresponds in the laminating direction to an internal area surrounded by the inductor and allows magnetic flux to pass therethrough.

The LC resonant antenna of the present invention may be configured such that the plurality of electrode plates each have an extended area that allows magnetic flux to pass therethrough and is continuous to the passage area, and that the extended area is formed to extend from the passage area to an outer peripheral end of each of the plurality of electrode plates in the surface direction.

DESCRIPTION OF EMBODIMENTS

Hereinafter, an LC resonant antenna according to one embodiment of the present invention will be described with reference to the attached drawings. The LC resonant antenna according to this embodiment is, for example, a small antenna incorporated into an article such as an RFID tag or a communication device.

The following description will be given based on the premise that, in this embodiment, the LC resonant antenna is a booster antenna of an on-chip antenna integrally formed with an IC chip itself, or a booster antenna for a feed coil composed of an IC chip and a coil.

Figure 1:
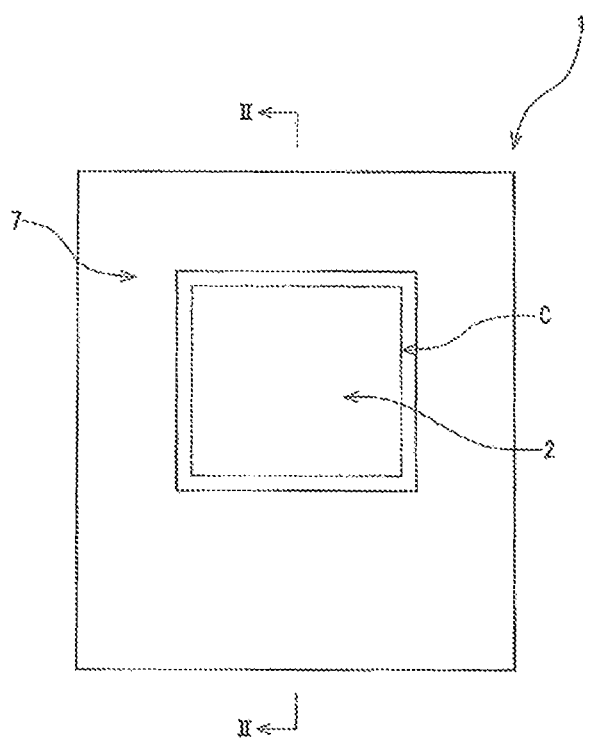
FIG. 1 is a plan view of an LC resonant antenna according to one embodiment of the present invention.
Figure 2:
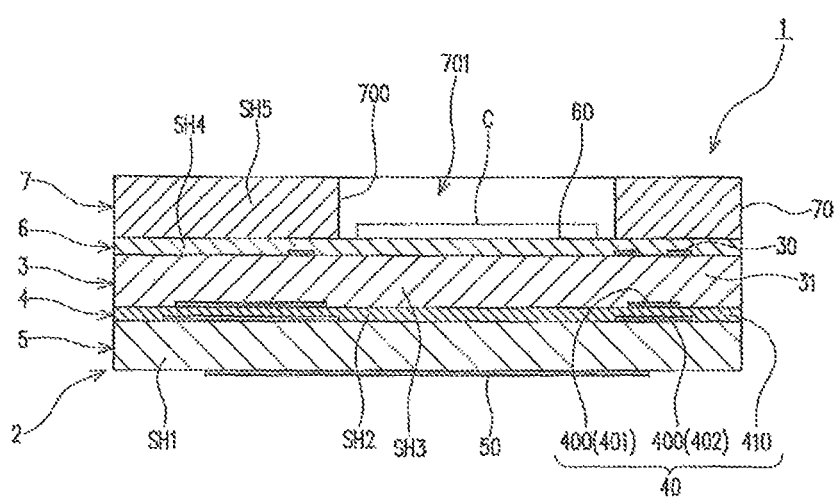
FIG. 2 is a cross-sectional view taken along line II-II in FIG. 1.

As shown in FIG. 1 and FIG. 2, an LC resonant antenna 1 includes a dielectric layer 2 formed by laminating sheets, and a resonant circuit (not numbered) provided on the dielectric layer 2.

As shown in FIG. 2, the dielectric layer 2 is prepared by laminating: a first sheet SH1 having one side on which an electrode plate 400 for constituting a capacitor 40 is formed and the other side on which a rectangular-shaped metal layer 8 is formed; a second sheet SH2 having one side on which another electrode plate 400 for constituting the capacitor 40 is formed; a third sheet SH3 having one side on which an inductor 30 is formed; a fourth sheet SH4 for covering the inductor 30; and a fifth sheet SH5 having an annular shape (angular annular shape in this embodiment), and subjecting these sheets to thermocompression bonding to each other, followed by sintering. In this embodiment, the electrode plate 400 formed on the second sheet SH2 is referred to as a first electrode plate 401, and the electrode plate 400 formed on the first sheet SH1 is referred to as a second electrode plate 402.

When a description is given with reference to a thickness direction of the first sheet SH1, the dielectric layer 2 is formed by laminating the second sheet SH2, the third sheet SH3, the first sheet SH4, and the fifth sheet SH5 in this order in the thickness direction on the one side of the first sheet SH1, the other side of the second sheet SH2, which is opposite to its one side, is laid on the second electrode plate 402, and the other side of the third sheet SH3, which is opposite to its one side, is laid on the first electrode plate 401 of the second sheet SH2.

The following description will be given in which, in this embodiment, the first sheet SH1 and a metal layer 50 formed on the first sheet SH1 are collectively referred to as a base layer 5; the second electrode plate 402, the second sheet SH2, and the first electrode plate 401 are collectively referred to as a capacitor layer 4; the third sheet SH3 and the inductor 30 collectively as an inductor layer 3; the fourth sheet SH4 as a cover layer 6; and the fifth sheet SH5 as a packaging layer 7. Further, the following description will be given in which, in this embodiment, a direction in which the inductor layer 3 and the capacitor layer 4 are laid on each other is referred to as a laminating direction; and a direction orthogonal to the laminating direction is referred to as a surface direction.

Each of the first to fifth sheet members SH1 to SH5 may be constituted by a single sheet, or may be constituted by laminating a plurality of sheets.

Figure 3:
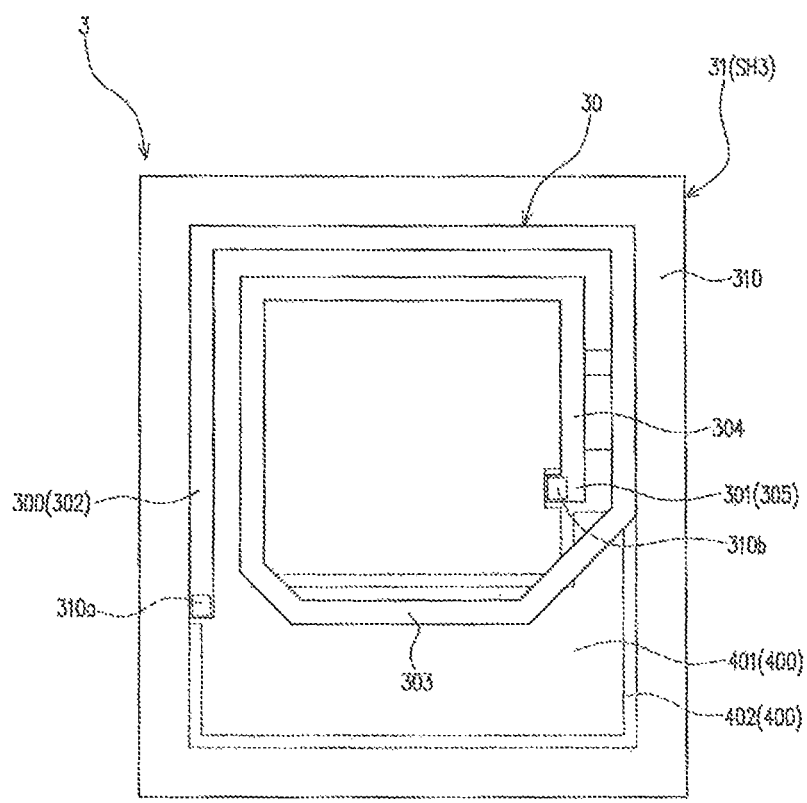
FIG. 3 is a plan view of an inductor layer of the LC resonant antenna according to the embodiment.

As shown in FIG. 3, the inductor layer 3 includes the inductor 30 having a coil shape (spiral shape in this embodiment).

The inductor layer 3 according to this embodiment includes the inductor 30 and an inductor forming layer 31 for forming the inductor 30. The inductor forming layer 31 corresponds to the third sheet SH3.

The inductor 30 is formed on one layer surface in the laminating direction of the inductor forming layer 31. The other layer surface in the laminating direction of the inductor forming layer 31 faces the capacitor layer 4. The following description will be given in which, in this embodiment, as shown in FIG. 3, the one layer surface of the inductor layer 3 is referred to as an inductor forming surface with the reference numeral of "310" while the other layer surface is referred to as an opposed surface.

The inductor forming layer 31 has a pair of vias (hereinafter referred to as first vias) 310a and 310b penetrating therethrough in the laminating direction.

The distances from the positions, at which the pair of first vias 310a and 310b are respectively formed, to a coil center of the inductor 30 (i.e., a winding center of the inductor 30) are different from each other. In this embodiment, the first via 310a further away from the coil center is referred to as an outer peripheral side first via 310a while the first via 310b closer to the coil center is referred to as an inner peripheral side first via 310b.

The inductor 30 is constituted by, for example, a conductive pattern formed into a thin film on the inductor forming surface 310 using a conductive material (conductive paste in this embodiment) composed mainly of gold, silver, copper, or an alloy thereof. The inductor 30 may be, for example, printed on the inductor forming surface 310 by screen printing. The inductor 30 may be formed by another printing method (intaglio, letterpress, ink jet), or may be formed by any method other than printing as long as a specific pattern shape can be obtained.

The inductor 30 according to this embodiment is constituted by a conductive line that is formed in a spiral shape within an annular area defined along an outer peripheral edge of a mounting space for the inductor 30 set on the inductor forming surface 310. Therefore, a central portion of the mounting space (i.e., inside the annular area) constitutes a non-forming area S1 in which the inductor 30 (conductive pattern) is not formed. The non-forming area S1 will be described later.

In this embodiment, an end portion 300 on the outer peripheral side of the inductor 30 (outer peripheral connecting end portion) is formed at a position corresponding to the outer peripheral side first via 310a, and an end portion 301 on the inner peripheral side of the inductor 30 (inner peripheral connecting end portion) is formed at a position corresponding to the inner peripheral side first via 310b.

The conductive line includes: an outer peripheral line portion 302 linearly extending from the position corresponding to the outer peripheral side first via 310a (linearly extending along each corresponding side of the outer peripheral end of the inductor forming layer 31 in this embodiment); an intermediate line portion 303 extending from the outer peripheral line portion 302 and swirling inward; and an inner peripheral line portion 304 linearly extending from a leading end of the intermediate line portion 303 toward the inner peripheral side first via 310b.

The conductive line according to this embodiment further includes an inner contact portion 305 formed to continue to a leading end of the inner peripheral line portion 304, and the inner contact portion 305 is formed at a position corresponding to the inner peripheral side first via 310b. Thus, in this embodiment, the outer peripheral connecting end portion 300 is constituted by one end portion in the longitudinal direction of the outer peripheral line portion 302, and the inner peripheral connecting end portion 301 is constituted by the inner contact portion 305.

Figure 4:
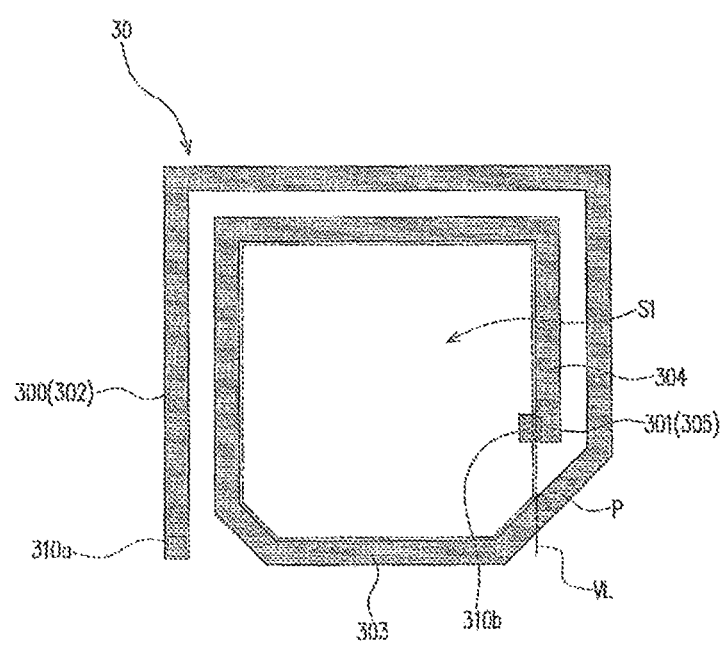
FIG. 4 is a plan view of an inductor of the LC resonant antenna according to the embodiment.

The non-forming area S1 will be described with an image thereof. As shown in FIG. 4, when an inner end side of the inner peripheral line portion 304 (i.e., an inner end side in the line width direction) is taken as a reference; a virtual line extending in a direction corresponding to the extending direction of this inner side is represented as virtual straight line VL; and a first crossing point of the virtual straight line VL and an inner end side of the intermediate line portion 303 is represented as crossing point P; the non-forming area S1 is an area defined by: the inner end side of the inner line portion 304; a portion of the inner end side of the intermediate line portion 303 extending from the crossing point between the inner end side of the inner peripheral line portion 304 and the inner end side of the intermediate line portion 303 to the crossing point P; and the virtual straight line VL. A part of the inner contact portion 305 projects into the non-forming area S1, and this part is regarded as a part of the non-forming area S1.

As shown in FIG. 2, the capacitor layer 4 is laminated on the inductor layer 3 in the laminating direction (in other words, in a direction in which an axis of the coil center of the inductor 30 extends), and is provided with the capacitor 40.

The capacitor layer 4 according to this embodiment includes a pair of electrode plates 400 and an intermediate layer 410 interposed between the pair of electrode plates 400. Therefore, in this embodiment, a distance between the pair of electrode plates 400 is determined by the thickness of the intermediate layer 410 (the thickness in the laminating direction). The intermediate layer 410 is constituted by the second sheet SH2.

One of the pair of electrode plates 400 arranged on the inductor layer 3 side (hereinafter referred to as a first electrode plate 401) is formed into a thin plate shape, and sandwiched in the laminating direction between the inductor layer 3 and the intermediate player 410.

Figure 5:
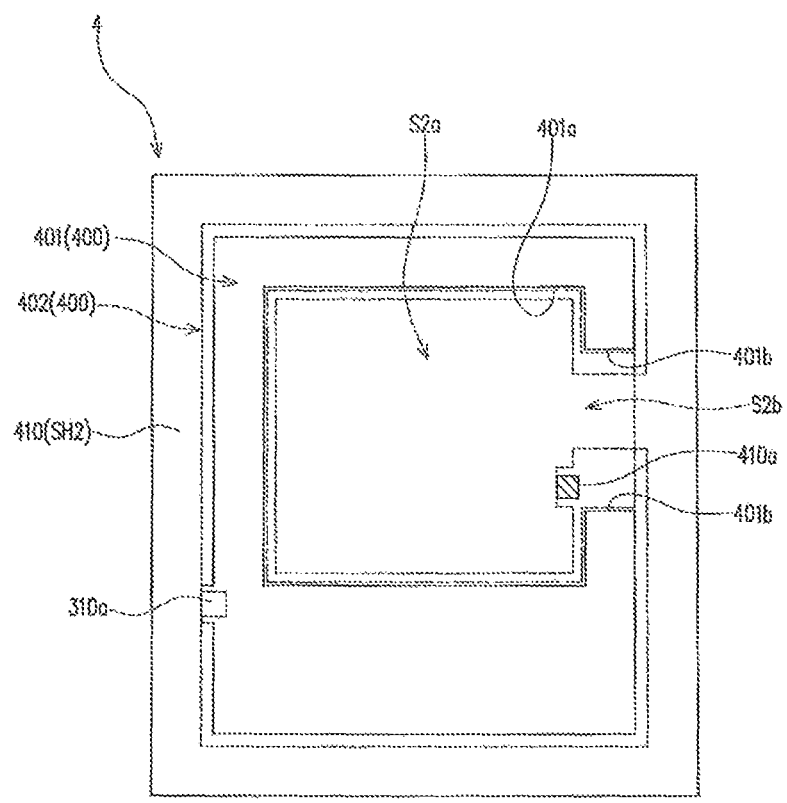
FIG. 5 is a plan view of a capacitor layer of the LC resonant antenna according to the embodiment.
Figure 6:
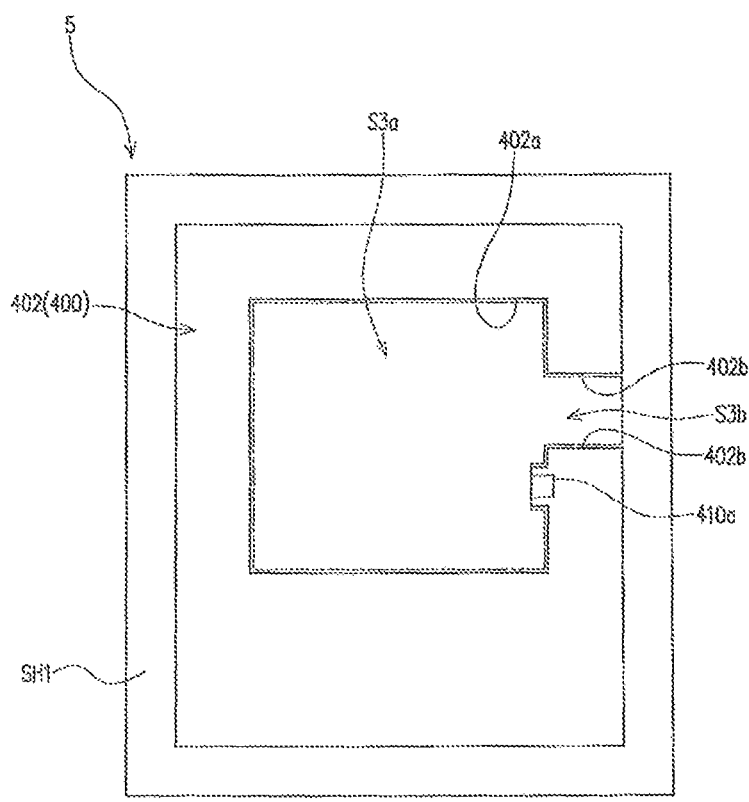
FIG. 6 is a plan view of an electrode plate and a base layer of the LC resonant antenna according to the embodiment.

As shown in FIG. 5, the first electrode plate 401 is provided at a position overlapping the mounting space in plan view. More specifically, the first electrode plate 401 is provided at a position overlapping part or all of the annular area in plan view.

The first electrode plate 401 is arranged at a position overlapping the outer peripheral side first via 310a in plan view (i.e., at a position corresponding to the outer peripheral side first via 310a in the laminating direction), and is electrically connected to the outer peripheral connecting end portion 300 via the outer peripheral side first via 310a.

As shown in FIG. 5, the first electrode plate 401 in this embodiment has an internal area (first internal area) S2a formed inside its outer peripheral edge portion, and an adjacent area (first adjacent area) S2b continuous (adjacent) to the first internal area S2a in the surface direction.

The first internal area S2a is formed to open in the laminating direction. In plan view, the first internal area S2a has a rectangular shape and is formed to be positioned within the non-forming area S1. Accordingly, an internal peripheral end of the first electrode plate 401 (hereinafter referred to as a first internal peripheral end) 401a is also formed to be positioned within the non-forming area S1 in plan view.

The first adjacent area S2b is formed to extend outward from the first internal area S2a along the surface direction, and formed to open in the surface direction at the outer peripheral edge of the first electrode plate 401.

In the first electrode plate 401 according to this embodiment, its outer peripheral edge portion is partially cut out to be non-continuous to form the first adjacent area S2b. Accordingly, the outer peripheral edge portion of the first electrode plate 401 has a pair of opposed ends (hereinafter referred to as first opposed ends) 401b that are opposed to each other at an interval therebetween.

An electrode plate (hereinafter referred to as a second electrode plate) 402 arranged in the laminating direction to align with the first electrode plate 401 via the intermediate layer 410 is formed into a thin plate shape. As shown in FIG. 2, the second electrode plate 402 is sandwiched in the laminating direction between the other layer surface in the laminating direction of the intermediate layer 410 and the base layer, which will be described later.

The second electrode 402 is arranged at a position overlapping the inner peripheral side first via 310b in plan view (i.e., at a position corresponding to the inner peripheral side first via 310b in the laminating direction), and is electrically connected to the inner peripheral connecting end portion 301 via the inner peripheral side first via 310b.

The second electrode plate 402 according to this embodiment has an internal area (second internal area) S3a formed inside its outer peripheral edge portion, and an adjacent area (second adjacent area) S3b continuous (adjacent) to the second internal area S3a in the surface direction.

The second internal area S3a is formed to open in the laminating direction. In plan view, the second internal area S3a has a rectangular shape and is formed to be positioned within the first internal area S2a. Accordingly, the second internal area S3a is also formed to be positioned within the non-forming area S1 in plan view. With this configuration, in this embodiment, an internal peripheral end of the second electrode plate 402 (hereinafter referred to as a second internal peripheral end) 402a is also formed to be positioned within the first internal area S2a and the non-forming area S1.

As described above, the second internal area S3a is formed at a position overlapping the first internal area S2a (i.e., formed to be positioned within the first internal area S2a) in plan view, and the area in which the first internal area S2a and the second internal area S3a overlap each other in plan view constitutes a passage area that allows magnetic flux generated from the inductor 30 to pass therethrough. The first internal area S2a and the second internal area S3a may be areas that allow magnetic flux to pass therethrough, and for example, a material that allows magnetic flux to pass therethrough may be present inside the areas.

The second adjacent area S3b is formed to extend outward from the second internal area S3a along the surface direction, and formed to open in the surface direction at the outer peripheral edge of the second electrode plate 402.

In the second electrode plate 402 according to this embodiment, its outer peripheral edge portion is partially cut out to be non-continuous to form the second adjacent area S3b. Accordingly, the outer peripheral edge portion of the second electrode plate 402 has a pair of opposed ends (hereinafter referred to as second opposed ends) 402b that are opposed to each other at an interval therebetween.

The second adjacent area S3b is formed at a position overlapping the first internal area S2a and the first adjacent area S2*b* (i.e., formed to be positioned within the first adjacent area S2*b*) in plan view. Thus, the first internal area S2*a* and the area in which the first adjacent area S2*b* and the second adjacent area S3*b* overlap each other in plan view constitute an extended area that extends from the passage area in the surface direction (i.e., toward the outside in the surface direction) and that allows magnetic flux to pass therethrough. In this embodiment, in plan view, there is an area in which the second adjacent area S3*b* and the first adjacent area S2*b* overlap each other, but the second adjacent area S3*b* and the first adjacent area S2*b* do not necessarily overlap each other. In this embodiment, in plan view, the first adjacent area S2*b* is formed to include the second adjacent area S3*b*, but for example, the second adjacent area S3*b* may be formed to include the first adjacent area S2*b*. Further, the first adjacent area S2*b* and the second adjacent area S3*b* may be areas that allows magnetic flux to pass therethrough, and for example, a material that allows magnetic flux to pass therethrough may be present inside the areas.

In the LC resonant antenna 1, the magnetic flux generated from the inductor 30 flows without being blocked in the area in which the non-forming area S1 overlaps the passage area and the extended area in plan view. Thus, in this embodiment, the area within the passage area and the extended area that is located in the non-forming area S1 in plan view is generically called a passage allowable area.

In the intermediate layer 410, a via (hereinafter referred to as a second via) 410*a* is formed at a position corresponding to the inner peripheral side first via 310*b* and the second electrode plate 402 in the laminating direction. Thus, in this embodiment, the inner peripheral connecting end portion 301 of the inductor 30 and the second electrode plate 402 are electrically connected to each other via the inner peripheral side first via 310*b* and the second via 410*a*.

With this configuration, in the LC resonant antenna 1 according to this embodiment, the outer peripheral connecting end portion 300 and the first electrode plate 401 are electrically connected to each other and the inner peripheral connecting end portion 301 and the second electrode plate 402 are electrically connected to each other to configure a resonant circuit in which the inductor 30 and the capacitor 40 are electrically connected to each other.

The dielectric layer 2 according to this embodiment further includes: the base layer 5 laminated on the other layer surface of the intermediate layer 410 (a layer surface of the intermediate layer 410 on the opposite side to the inductor 3) in the capacitor layer 4; the cover layer 6 laminated on the inductor layer 3; and the packaging layer 7 laminated on the cover layer 6, in addition to the inductor layer 3 and the capacitor layer 4.

The base layer 5 has one layer surface in the laminating direction that is opposed to the other layer surface of the intermediate layer 410. The other layer surface in the laminating direction of the base layer 5 has the metal layer 50 having a rectangular shape in bottom view.

The cover layer 6 includes a cover surface that is a layer surface opposed to the inductor forming surface 310 and a reference surface 60 that is a layer surface on the opposite side to the cover surface in the laminating direction, and the dielectric layer 2 has an outer surface partially constituted by the reference surface 60. The reference surface 60 refers to a plane closest in the laminating direction to the inductor 30 out of planes positioned on the opposite side to the capacitor layer 4 with respect to the inductor layer 3, and in this embodiment refers to a plane surrounded by a peripheral wall layer 70, which will be described later, out of the outer surface (upper surface) of the cover layer 6.

The packaging layer 7 has the annular peripheral wall layer 70 laminated on the reference surface 60 of the cover layer 6.

In this embodiment, an inner peripheral surface 700 of the peripheral wall layer 70 and an area of the reference surface 60 of the cover layer 6 corresponding to the opening of the peripheral wall layer 70 define one mounting recess 701.

One peripheral wall layer 70 may be laminated on the reference surface 60, or two or more peripheral wall layers 70 may be laminated thereon.

The mounting recess 701 is a space for mounting an IC chip C therein, and the IC chip C and the LC resonant antenna 1 can be integrated with each other by, for example, placing the IC chip C on the reference surface 60, followed by filling the mounting recess 701 with resin. The IC chip C may be a feed coil composed of an IC chip and a coil.

The configuration of the LC resonant antenna 1 according to this embodiment has been described as above. Subsequently, a description will be given on a method of manufacturing the LC resonant antenna 1 according to this embodiment.

A sheet material that serves as a sheet constituting the dielectric layer 2 is prepared by applying slurry to a tape, followed by drying. The slurry is prepared by stirring ceramic powder, glass powder (low melting point glass frit), an organic binder, and an organic solvent.

Since the sheet material is prepared to entirely have a constant thickness, different sheet materials each having a thickness of each of the sheets constituting the dielectric layer 2 are individually prepared.

The tape is peeled and removed from the sheet material that has been dried, and a sheet having a specific size is cut out of the sheet material. In this embodiment, the sheet cut out of the sheet material is referred to as green sheet.

Subsequently, through holes that respectively serve as the outer peripheral side first via 310*a* and the inner peripheral side first via 310*b* are formed through the green sheet for the inductor layer 3 by punching or laser. A through hole that serves as the second via 410*a* is formed through the green sheet serving as the intermediate layer 410 by punching or laser.

Further, a pattern conforming to the shape of the inductor 30 is formed on the green sheet for the inductor layer 3 by screen printing using conductive paste. At this time, the outer peripheral side first via 310*a* and the inner peripheral side first via 310*b* are filled with conductive paste. Then, the conductive paste constituting the pattern and the conductive paste with which the outer peripheral side first via 310*a* and the inner peripheral side first via 310*b* are filled are allowed to dry.

The first electrode plate 401 is printed using conductive paste on the green sheet for the intermediate layer 410, and the second via 410 is filled with conductive paste. Then, the conductive paste constituting the first electrode plate 401 and the conductive paste with which the second via 410*a* is filled are allowed to dry.

The second electrode plate 402 is printed using conductive paste on one side of the green sheet for the base layer 5, and the metal layer 8 is printed on the other side thereof.

The green sheet for the inductor layer 3 has inductor patterns, outer peripheral side first vias 310*a*, and inner peripheral side first vias 310*b* formed for a plurality of LC resonant antennas 1.

The green sheet for the intermediate layer 410 has first electrode plates 401 and second vias 410*a* formed for a plurality of LC resonant antennas 1. Similarly, the green sheet for the base layer 5 has second electrode plates 402 and metal layers 50 printed for a plurality of LC resonant antennas 1.

After the sheets constituting the dielectric layer 2 are prepared, the sheets are laminated in the specific order, followed by being subjected to thermocompression bonding to each other in the laminated state to prepare one laminated body. The laminated body is further sintered to prepare a sintered body.

In the process of sintering, organic substances included in the laminated body are first removed at a temperature equal to or less than the softening point of a glass component, for example at around 500° C., and then fired at a temperature determined according to the melting point of the glass component or a conductive material used for a wiring part, for example at 800 to 1050° C.

The conductive part that has been exposed (the metal layer 8 in this embodiment) on the surface of the sintered body is first subjected to electroless Ni (nickel) plating, followed by electroless Au (gold) plating.

Then, the plurality of LC resonant antennas 1 formed in the single sintered body are cut into individual pieces using a dicer. The LC resonant antenna 1 is thus manufactured.

In manufacturing the LC resonant antenna 1, it is important to control each sheet manufactured in the manufacturing steps to have a desired thickness since the distance between the first electrode plate 401 and the second electrode plate 402 (i.e., the distance between electrode plates), the distance in the laminating direction between the inductor 30 and the capacitor 40 (specifically, the first electrode plate 401 of the capacitor 40), and the distance between the inductor 30 and the reference surface 60, which should hardly vary, change as the thickness of a sheet changes.

For example, the thickness of each sheet changes due to shrinkage or the like in the step of thermocompression bonding of the sheets (thermocompression bonding step) and the step of sintering the sheets (sintering step), and the thickness of each sheet changes depending on the shape and dimension of the conductive pattern, the position of a via, or the like in the step of printing the inductor 30, the first electrode plate 401, the second electrode plate 402, and the metal layer 50 (printing step).

Thus, in this embodiment, in the step of preparing a sheet material, that is, the step of applying slurry to a tape (applying step), the thickness of the slurry applied to the tape is adjusted in view of a change in the thickness of a sheet in the thermocompression boding process, the sintering process, and the printing process, so that the thicknesses of the manufactured sheets of the LC resonant antenna 1 respectively have desired dimensions. More specifically, slurry is applied to a tape by the doctor blade method, during which the height of the blade edge is adjusted to be capable of adjusting the thickness of a sheet.

In the subsequent steps also, it is preferable that the manufacturing conditions in each of the subsequent steps be controlled so that the change in thickness remains at a constant value.

As described above, the LC resonant antenna 1 according to this embodiment allows the magnetic flux generated from the inductor 30 to flow to pass through the internal area surrounded by the inductor 30.

In the LC resonant antenna 1, the inductor 30 and the capacitor 40 (electrode plates 400) are arranged to be aligned with each other in the laminating direction, but the electrode plates 400 each have the passage area that corresponds in the laminating direction to the internal area surrounded by the inductor 30 and that allows magnetic flow to pass therethrough. This configuration can prevent the electrode plates 400 from blocking the flow of the magnetic flux attempting to pass through the internal area surrounded by the inductor 30.

Accordingly, the LC resonant antenna 1 according to this embodiment can produce an excellent effect of increasing the read distance by suppressing a reduction in the magnetic flux passing inside the inductor 30.

Since each of the electrode plates 400 has the extended area that extends from the passage area to the outer peripheral end of the electrode plate 400 in the surface direction, a portion of the electrode plate 400 around the passage area is non-continuous in the peripheral direction.

Thus, the LC resonant antenna 1 is configured not to generate eddy current circulating around the passage area of the electrode plate 400 when the magnetic flux generated from the inductor 30 passes through the passage area.

Thus, the LC resonant antenna 1, which prevents generation of eddy current that weakens the magnetic flux passing through the passage area, can suppress the magnetic flux passing inside the inductor from being weakened.

It is a matter of course that the LC resonant antenna of the present disclosure is not limited to the aforementioned one embodiment, but various modifications can be made without departing from the gist of the present disclosure.

The LC resonant antenna in the aforementioned embodiment has been described based on the premise that the LC resonant antenna 1 is a booster antenna of an on-chip antenna, or a booster antenna of a feed coil composed of an IC chip and a coil, without limitation thereto. The LC resonant antenna 1 may be, for example, a main antenna of an IC chip in which an antenna is not integrally formed.

The aforementioned embodiment has been described by taking, for example, the case where the inductor 30 is formed in a spiral shape, without limitation thereto. For example, the inductor 30 may have a helical shape. In the case where the inductor 30 having a helical shape is configured, for example, a plurality of patterns formed of the conductive material respectively on the layer surfaces of different layers may be connected to each other.

Although not specifically mentioned in the aforementioned embodiment, the inductor 30, and the first electrode plate 401 and the second electrode plates 402 of the capacitor 40 have sizes in the surface direction that can be appropriately modified.

In the aforementioned embodiment, the packaging layer 7 is laminated on the cover layer 6, but no packaging layer 7 can be laminated on the cover layer 6. However, it is easier to integrally form the IC chip C and the LC resonant antenna 1 together when the packaging layer 7 is laminated on the cover layer 6.

In the above embodiment, the metal layer 50 is laminated on the dielectric layer 2 (base layer 5), but no metal layer 50 can be laminated on the base layer 5. In the case where the LC resonant antenna 1 is structured to include the metal layer 50, the resonant circuit can be designed in consideration of the effect of metal on resonant frequency in advance, and thus designed to prevent the resonant frequency from changing even when the LC resonant antenna 1 is mounted to, for example, a metal structure.

EXAMPLES

Hereinafter, the present invention will be described in more detail by way of examples and comparative examples, without limitation thereto.

Example 1

Figure 7:
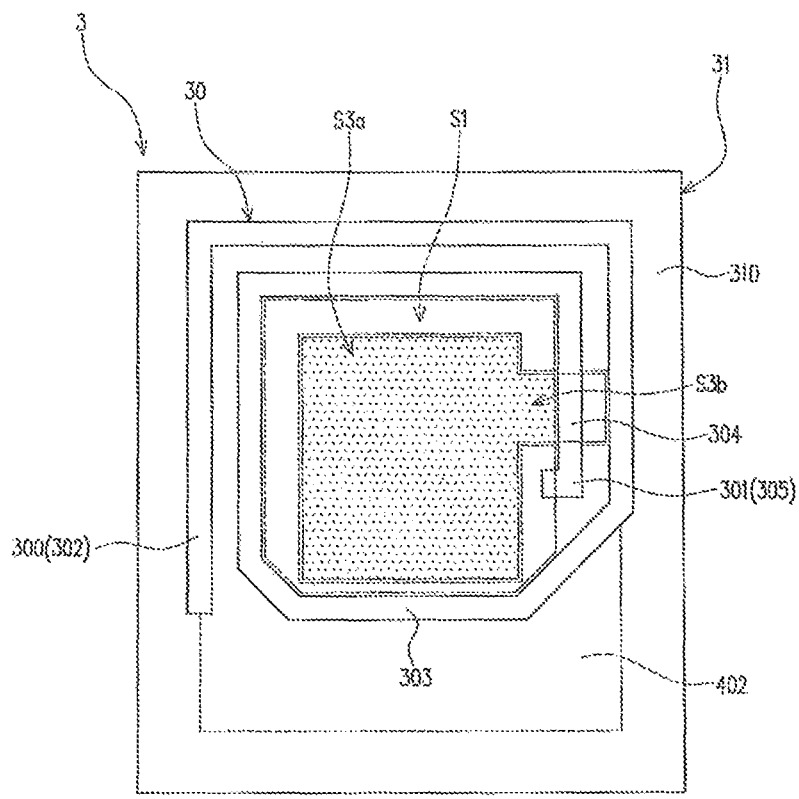
FIG. 7 is a plan view of an LC resonant antenna according to Example 1.

As shown in FIG. 7, an LC resonant antenna 1 having a similar structure to that of the aforementioned embodiment was prepared as Example 1. Example 1 is configured so that, when the area of the non-forming area S1 is represented as $H_{ac}$ and the area of the passage allowable area is represented as Hai, an aperture ratio A determined by Expression 1 below is 66.83%.

$$A(\%) = \frac{H_{ai}}{H_{ac}} \times 100 \qquad \text{Expression 1}$$

Example 2

Figure 8:
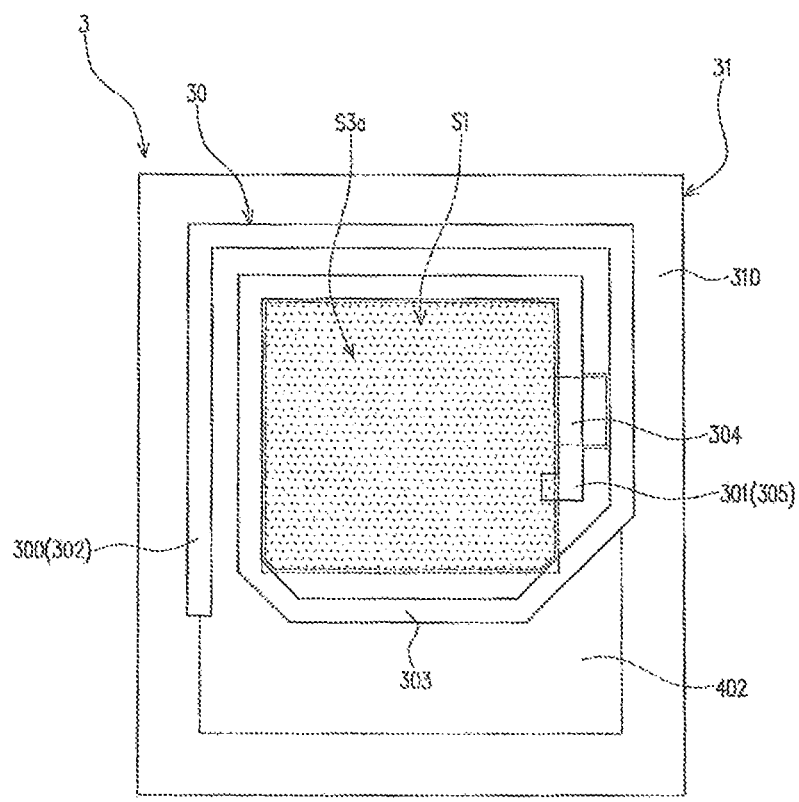
FIG. 8 is a plan view of an LC resonant antenna according to Example 2.

As shown in FIG. 8, an LC resonant antenna 1 having a similar structure to that of the aforementioned embodiment and configured so that the aperture ratio A determined by Expression 1 was 93.35% was prepared as Example 2.

Example 3

Figure 9:
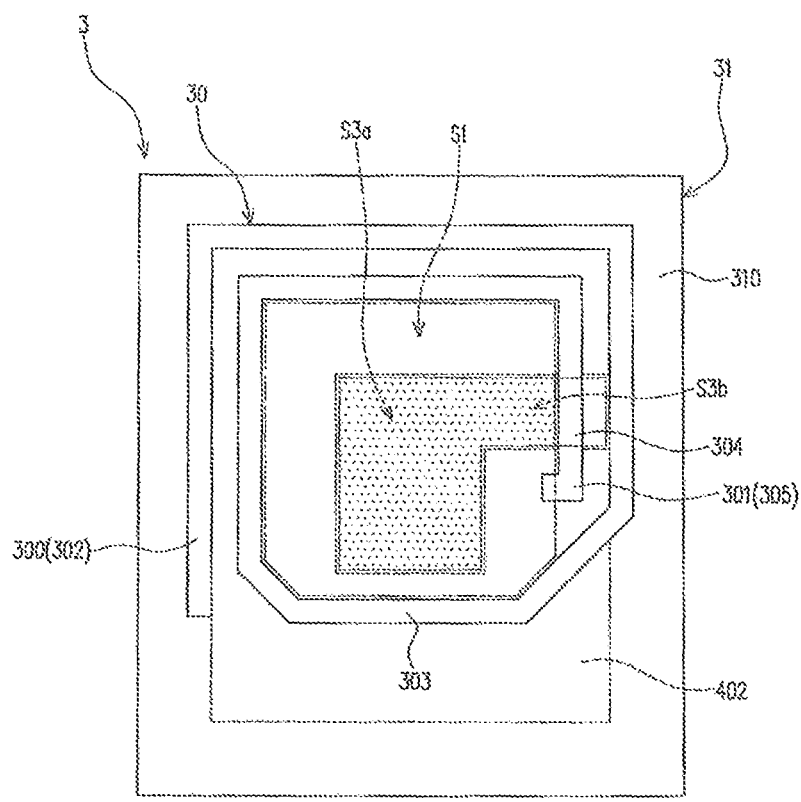
FIG. 9 is a plan view of an LC resonant antenna according to Example 3.

As shown in FIG. 9, an LC resonant antenna 1 having a similar structure to that of the aforementioned embodiment and configured so that the aperture ratio A determined by Expression 1 was 40.31% was prepared as Example 3.

Example 4

Figure 10:
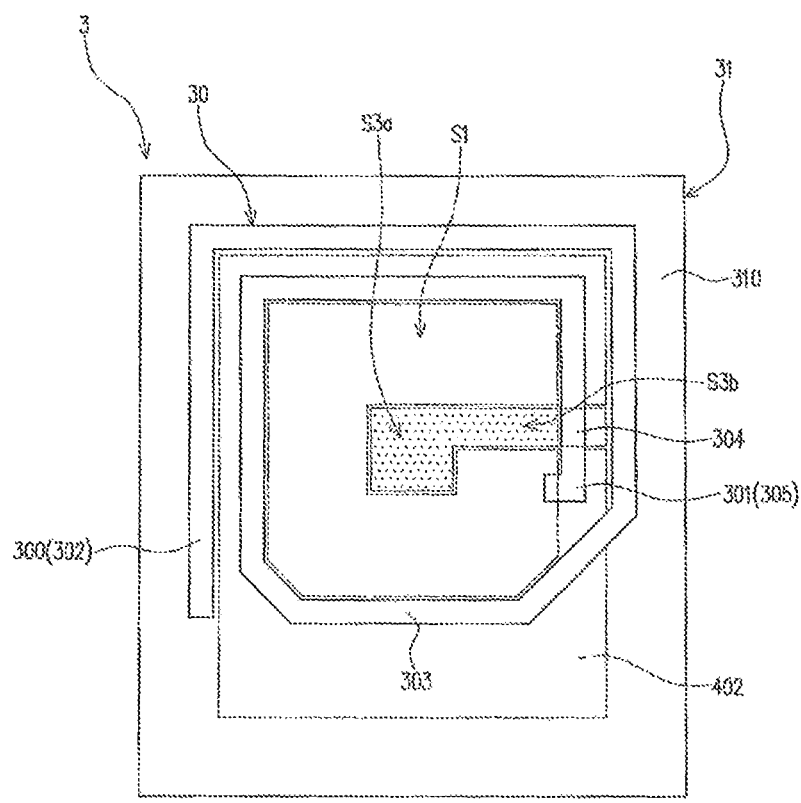
FIG. 10 is a plan view of an LC resonant antenna according to Example 4.

As shown in FIG. 10, an LC resonant antenna 1 having a similar structure to that of the aforementioned embodiment and configured so that the aperture ratio A determined by Expression 1 was 14.51% was prepared as Example 4.

Example 5

Figure 11:
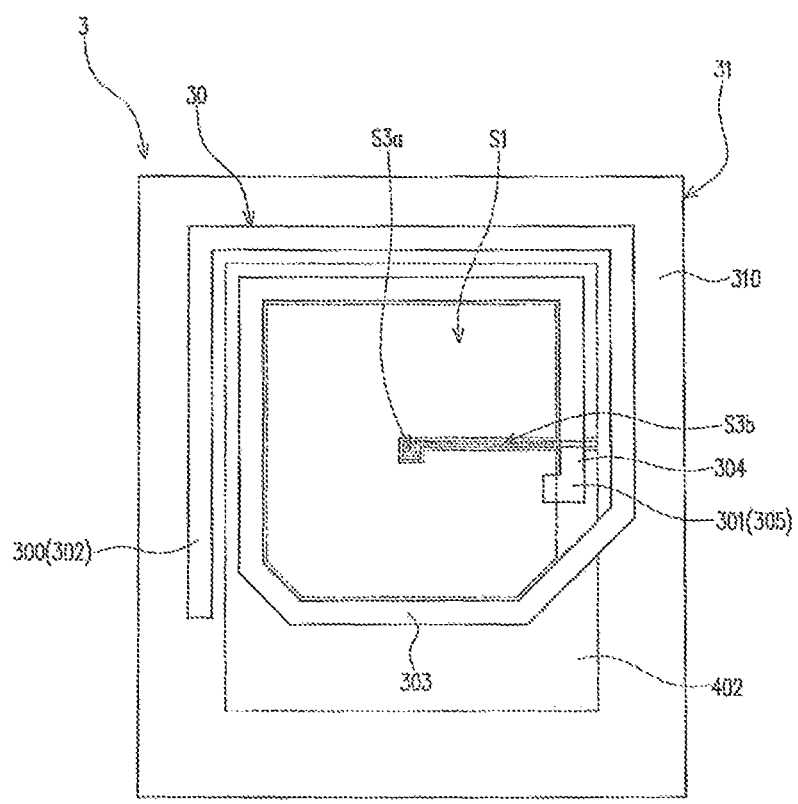
FIG. 11 is a plan view of an LC resonant antenna according to Example 5.

As shown in FIG. 11, an LC resonant antenna 1 having a similar structure to that of the aforementioned embodiment and configured so that the aperture ratio A determined by Expression 1 was 2.74% was prepared as Example 5.

Comparative Example

Figure 12:
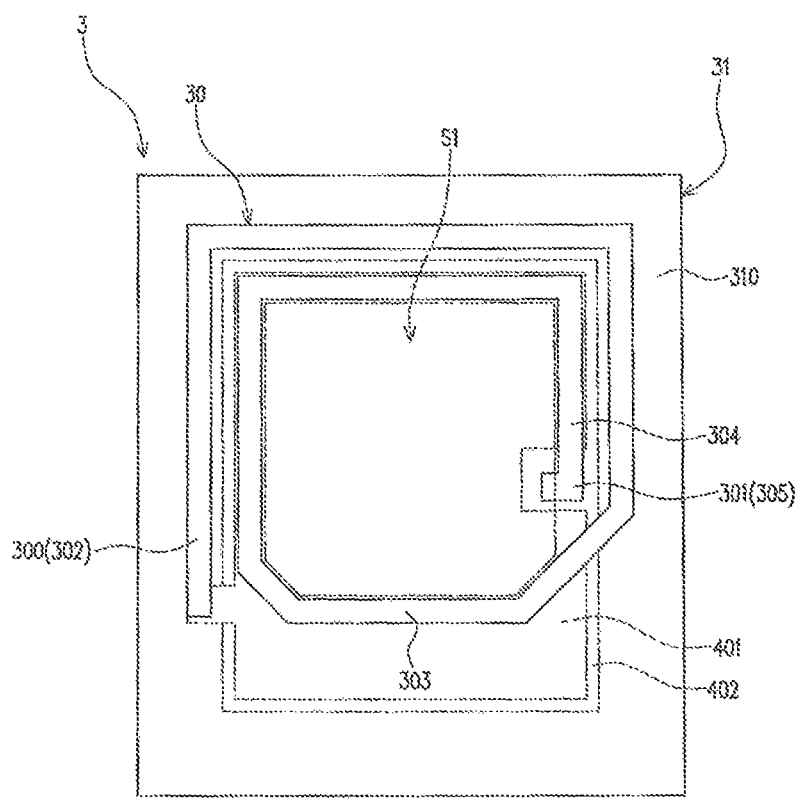
FIG. 12 is a plan view of an LC resonant antenna according to Comparative Example.

As shown in FIG. 12, an LC resonant antenna 1 having a similar layer structure to that of the aforementioned embodiment and configured so that the aperture ratio A determined by Expression 1 was 0% was prepared as Comparative Example. The LC resonant antenna of Comparative Example has a capacitor 40 constituted by electrode plates 400. The electrode plates 400 are constituted by a first electrode plate 401 and a second electrode plate 402 both shown in FIG. 12. The first electrode plate 401 has no first internal area S2a or first adjacent area S2b described in the aforementioned embodiment, and the second electrode plate 402 has no second internal area S3a or second adjacent area S3b described in the aforementioned embodiment. These electrode plates have no passage area or extended area formed thereon.

(Simulation Test of Read Distances)

Simulation calculations were performed for the read distances of the LC resonant antennas 1 of Examples 1 to 5 and Comparative Example. In the simulation calculations, the read distances at the same magnetic field intensity were calculated for the LC resonant antennas 1 of Examples 1 to 5 and Comparative Example. The magnetic field intensity was set to 0.0200 A/m, which was deemed to be a minimum required value for communication. The read distance was calculated with reference to a surface of each of the LC resonant antennas 1.

(Evaluation of Simulation Test of Read Distances)

Figure 13:
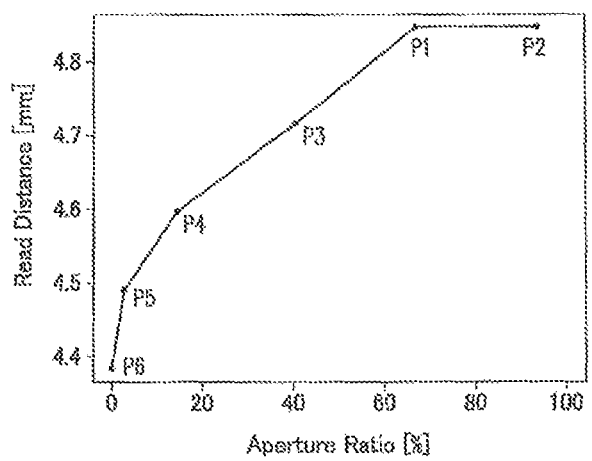
FIG. 13 is a graph showing the results of the simulation test of the read distances of Examples 1 to 5 and Comparative Example.

FIG. 13 shows the results of the simulation test of the read distances. In FIG. 13, the signs "P1 to P5" are given to the test results (i.e., read distances) of the LC resonant antennas 1 of Examples 1 to 5, respectively, and the sign "P6" is given to the test result (i.e. read distance) of the LC resonant antenna 1 of Comparative Example.

As shown in FIG. 13, comparing the read distance P6 of the LC resonant antenna 1 of Comparative Example with the read distances P1 to 5 of the LC resonant antennas 1 of Examples 1 to 5, it is found that the read distance increases when the electrode plates 400 constituting the capacitor 40 each have the passage area and the extension area.

Further, comparing the read distances P1 to P5 of the LC resonant antennas 1 of Examples 1 to 5 with one another, it is found that the larger the aperture ratio A, the longer the read distance, but that the read distances are not different from each other between the LC resonant antenna 1 configured to have an aperture ratio A of 66.83% and the LC resonant antenna 1 configured to have an aperture ratio of more than 66.83%. The results of the simulation test of the read distances shown in FIG. 13 show that the aperture ratio is preferably 2% or more, more preferably 30% or more, most preferably 60% or more.

(Simulation Test of Read Distance Improved by Apertures of Electrode Plates of Capacitor)

Next, a description will be given on a simulation test on the improved read distance.

In this test, the read distances were obtained by performing simulation calculations of the electromagnetic fields, with various different distances (intervals) in the laminating direction between the inductor 30 and the capacitor 40 (specifically, the first electrode plate 401 of the capacitor 40) for each of Examples 2 and 3 and Comparative Example. Table 1 below shows the intervals between the inductor 30 and the capacitor 40 that were used when the read distances for each of Examples 2 and 3 and Comparative Example were obtained.

TABLE 1

|  | Example 2 (A = 93.35%) | Example 3 (A = 40.31%) | C. Example (A = 0%) |
|---|---|---|---|
| Interval between inductor and capacitor | 0.05 mm | 0.05 mm | — |
|  | 0.10 mm | 0.10 mm | — |
|  | — | — | 0.135 mm |
|  | 0.15 mm | — | 0.15 mm |
|  | 0.20 mm | 0.20 mm | 0.20 mm |
|  | 0.25 mm | 0.25 mm | 0.25 mm |
|  | 0.35 mm | 0.35 mm | 0.35 mm |
|  | — | 0.45 mm | 0.45 mm |

(Evaluation of Simulation Test of Read Distance Improved by Apertures of Electrode Plates of Capacitor)

Figure 14:
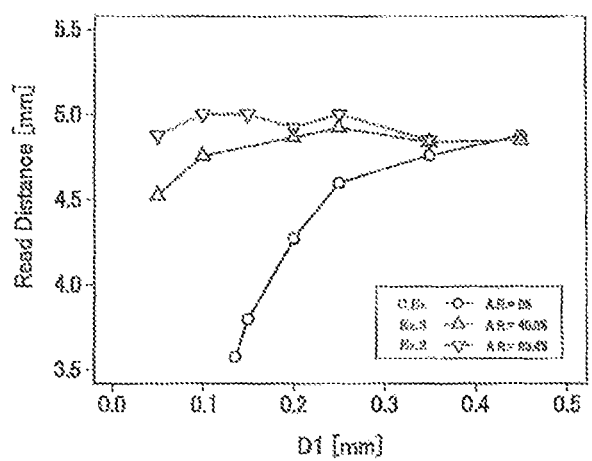
FIG. 14 is a graph showing the results of the simulation test of the read distances of the LC resonant antennas according to Examples 2 and 3, and the LC resonant antenna according to Comparative Example.

As shown in FIG. 14, in the LC resonant antenna of Comparative Example, the read distance is attenuated when the interval between the inductor 30 and the capacitor 40 with no aperture formed therein decreases, from which it is found that the magnetic flux generated from the inductor 30 is blocked by the capacitor 40 when the interval between the inductor 30 and the capacitor 40 decreases. The horizontal axis D1 in FIG. 14 represents the distance between the inductor 30 and the first electrode plate 401 of the capacitor 40.

The read distance of the LC resonant antenna of Comparative Example is attenuated greatly compared to the read distances of the LC resonant antennas of Examples 2 and 3 as the interval between the inductor 30 and the capacitor 40 decreases. It is found therefrom that, in the case where the capacitor 40 is positioned within the range of area through which the magnetic flux generated from the inductor 30 passes, the aperture formed in the capacitor 40 allows the magnetic flux to flow better, and is further found that the smaller the interval between the inductor 30 and the capacitor 40, the more greatly the effect of the improved passage of magnetic flux is enhanced by the aperture formed.

Further, the read distance of the LC resonant antenna of Example 3 is attenuated more remarkably than the read distance of the LC resonant antenna 1 of Example 2 when the interval between the inductor 30 and the capacitor 40 decreases, from which it is found that a high aperture ratio A enhances the effect of the improved passage of magnetic flux.

REFERENCE SIGNS LIST

1: Resonant antenna
2: Dielectric layer
3: Inductor layer
4: Capacitor layer
5: Base layer
6: Cover layer
7: Packaging layer
30: Inductor
31: Inductor forming layer
40: Capacitor
50: Metal layer
60: Reference surface
70: Peripheral wall layer
300: Outer peripheral connecting end portion
301: Inner peripheral connecting end portion
302: Outer peripheral line portion
303: Intermediate line portion
304: Inner peripheral line portion
305: Inner contact portion
310: Inductor forming surface
310*a*: First via (outer peripheral side first via)
310*b*: First via (inner peripheral side first via)
400: Electrode plate
401: First electrode plate
402: Second electrode plate
410: Intermediate layer
410*a*: Second via
700: Inner peripheral surface
701: Mounting recess
A: Aperture ratio
C: Chip
P: Crossing point
S1: Non-forming area
S2*a*: First internal area
S2*b*: First adjacent area
S3*a*: Second internal area
S3*b*: Second adjacent area
VL: Virtual straight line

The invention claimed is:

1. An LC resonant antenna comprising:
    an inductor layer provided with a coil-shaped inductor; and
    a capacitor layer provided with a capacitor and laminated on the inductor layer,
    wherein the capacitor comprises a plurality of electrode plates that are aligned with the inductor in a laminating direction of the inductor layer and the capacitor layer and that extend in a surface direction orthogonal to the laminating direction,
    wherein the inductor is formed to have an axis of a coil center extending in a direction that coincides or substantially coincides with the laminating direction, and
    wherein the plurality of electrode plates each have a passage area that penetrates therethrough in the laminating direction at a position corresponding in the laminating direction to an internal area surrounded by the inductor and that allows magnetic flux to pass therethrough.

2. The LC resonant antenna according to claim 1, wherein the plurality of electrode plates each have an extended area that allows magnetic flux to pass therethrough and is continuous to the passage area, and
    the extended area is formed to extend from the passage area to an outer peripheral end of each of the plurality of electrode plates in the surface direction.

3. The LC resonant antenna according to claim 2, wherein the plurality of electrode plates comprise an electrode larger than the internal area surrounded by the inductor.

4. The LC resonant antenna according to claim 3, wherein the capacitor of the capacitor layer comprises a single capacitor, and
    the plurality of electrode plates comprise a pair of electrodes.

5. The LC resonant antenna according to claim 1, wherein the plurality of electrode plates comprise an electrode larger than the internal area surrounded by the inductor.

6. The LC resonant antenna according to claim 5, wherein the capacitor of the capacitor layer comprises a single capacitor, and
    the plurality of electrode plates comprise a pair of electrodes.

7. The LC resonant antenna according to claim 1, wherein the capacitor of the capacitor layer comprises a single capacitor, and
    the plurality of electrode plates comprise a pair of electrodes.

\* \* \* \* \*